June 22, 1943.   E. M. WARD   2,322,606
INTERNAL COMBUSTION ENGINE
Filed Sept. 3, 1940
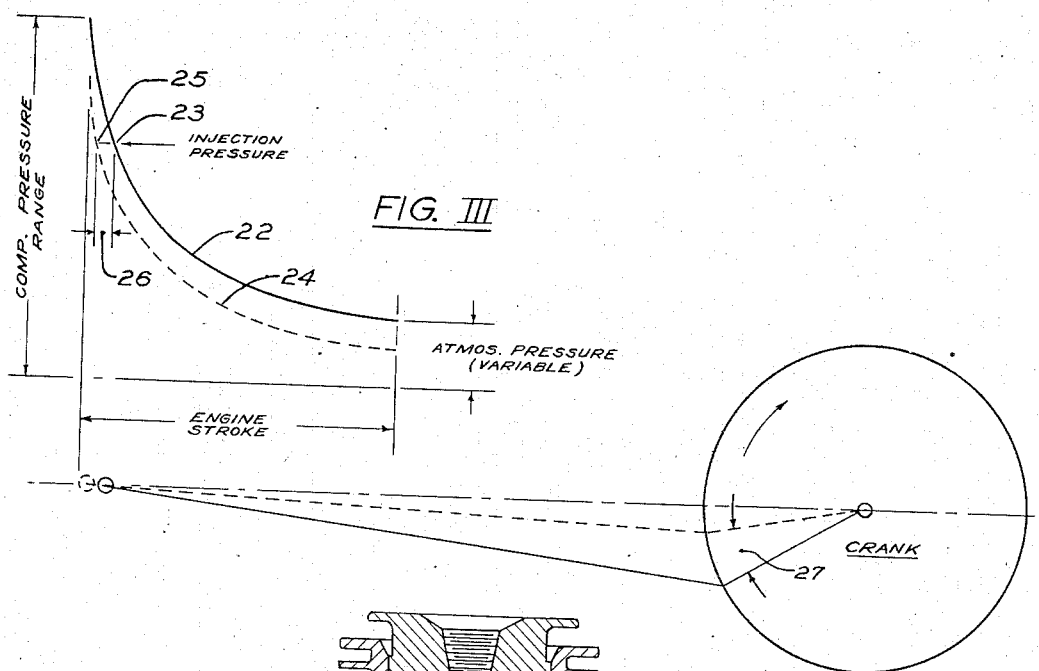
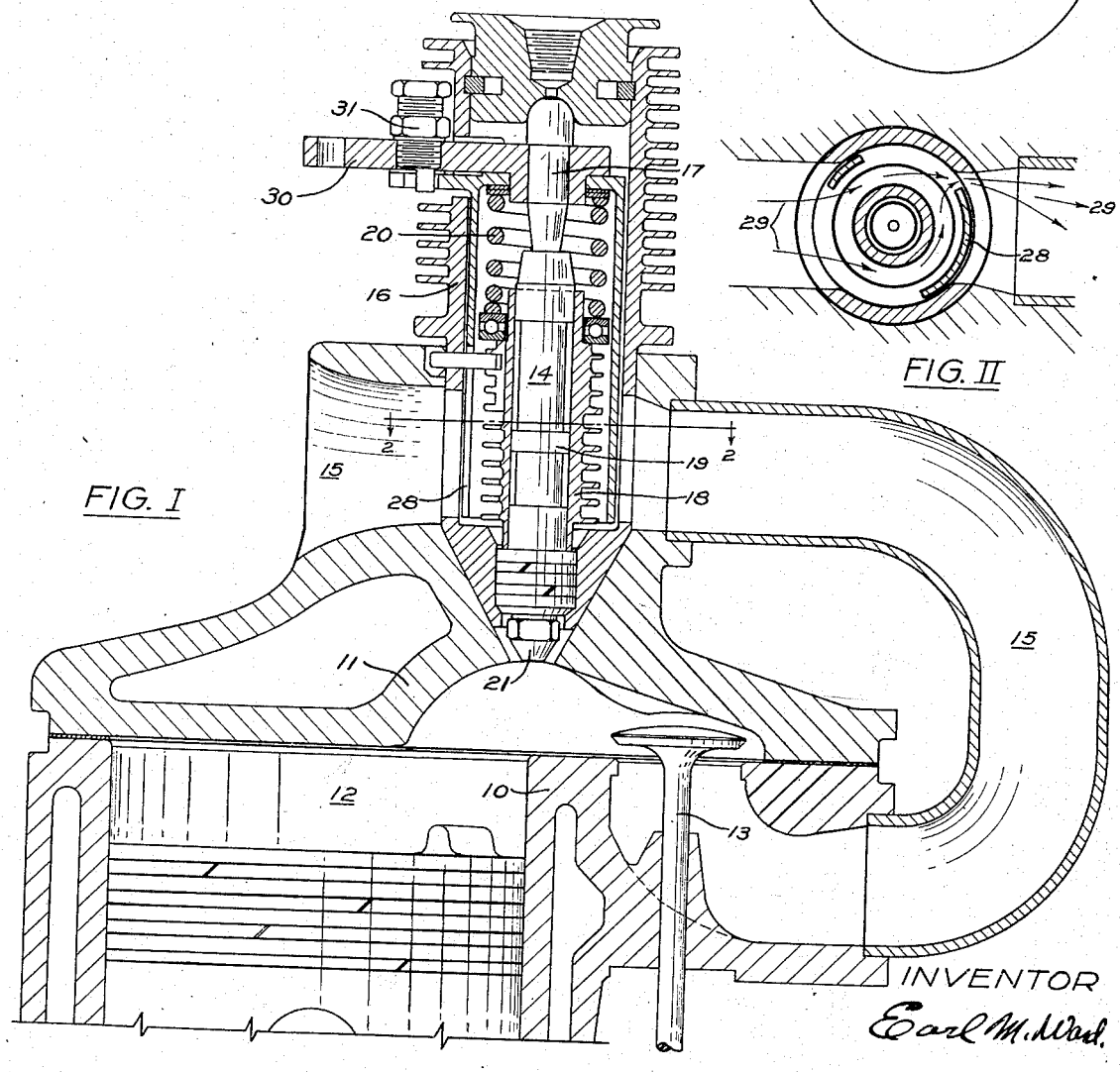
INVENTOR
Earl M. Ward Patented June 22, 1943

2,322,606

UNITED STATES PATENT OFFICE 2,322,606

INTERNAL COMBUSTION ENGINE

Earl M. Ward, Los Angeles, Calif., assignor of twenty-five per cent to George C. Sullivan, Hollywood, Calif.

Application September 3, 1940, Serial No. 355,172

4 Claims. (Cl. 123—32)

This invention relates to a novel construction of internal combustion engine, and has for its principal object an automatically operated fuel injection and timing system which is simple in construction, absolutely reliable in its operations, and may be employed with either two or four cycle engines of any power or speed, whether operating on gasoline, heavier oils, or other forms of liquid or fluid fuel.

Another object of this invention is to provide an injection device, which is actuated by the internal pressure of the engine cylinder with which it is associated, and which will automatically produce a fuel charge sufficient to satisfy the requirements of the engine.

A further object is to provide a construction of internal combustion engine which combines fuel injection, fuel quantity, air throttling and injection timing into a compact and single unit.

Still another object of my invention is to provide a means of cooling the fuel passages of the injection device directly by the intake air.

Still further objects and advantages will be apparent upon further examination of the novel features of construction, combination and arrangement of parts described in the following specification and particularly pointed out in the appended claims.

In order to illustrate the invention, I have shown in the drawing one embodiment thereof, but without being limited thereto, wherein:

Figure I is an illustrative construction of the invention showing an injecting device partly installed within the intake port of an internal combustion engine and so constructed as to co-ordinate the fuel quantity and injection timing, the latter being accomplished through varying the compression pressure by throttling of the intake air; Figure II is a sectional view through the injector at line 2—2 of Figure I; Figure III is a graphical illustration of the novel principle under which this invention operates.

In the drawing, particularly Figure I, the cylinder 10 of an internal combustion engine forms with the cylinder head 11 a combustion space or chamber 12, all of which is more or less conventional construction. This view is taken in section opposite the intake side of the cylinder, as is shown by intake valve 13.

The injector 14 is preferably mounted and associated with the air intake channel 15 as is shown by the drawing. In this manner the control of the air intake, which controls timing, and the control of fuel quantity may be accomplished in the simplest manner, as will be described hereafter. Further, due to high compression and injection pressures, the temperatures of the working parts of the injector should be maintained at a reasonably low figure. To do this, I have added cooling fins to the injector and disposed it within the air intake channel or passage 15.

The construction of the injector which I prefer to use will be found illustrated and described in greater detail in my copending application, Serial No. 355,173, filed of even date herewith, so that reference will be made herein only to the principal parts thereof. The injector comprises in general, a housing or body 16, an adjustable injector plunger 17, a cylinder sleeve 18, a differential area piston and injector cylinder 19, a piston restraining spring 20 and a spray tip or nozzle 21. Briefly, the injector, and more particularly the piston and cylinder 19, operates when sufficient pressure is developed within the chamber 12 to overcome the resisting force of the spring 20, whereupon the fuel is forced from the injector, through internal fuel passage, into the chamber 12 where it is ignited and work produced.

One of the principal features of my invention is in the use of a novel principle of controlling the intake air in order to determine the time of fuel injection. I have found that by controlling the intake air, and thus the atmospheric pressure in the engine at the start of compression, it is possible to accurately control the timing of injection. This feature, in conjunction with the proper regulation of fuel quantity and engine speed, presents a novel, highly desirable and highly efficient fuel system which is particularly adapted to the modern high speed internal combustion engine.

In as much as the power required to operate the injector 14 is dependent upon the area of the injector piston 19, the strength of the resisting spring 20 and the compression pressure at a certain piston position and inasmuch as the compression pressure is dependent on the engine atmospheric pressure at start of compression, and is always in direct relation to each other, it will become apparent that a variation of engine atmospheric pressure at start of compression will vary the position of the piston for a fixed compression pressure required to actuate the injector. It will be seen that if the intake air is throttled, preferably in the air intake channel 15, a certain amount, it will cause the engine atmospheric line at intake to be a certain amount below the previous one thus delaying the time of injection or reducing the crank angle in respect to the top dead center position of the piston.

This may be best explained by making reference to Figure III, a diagram of the relationship of pressures to piston position at time of injection, the latter being represented by crank angles. Its operation is explained in the following manner. If the start of the injection is to be at a predetermined percentage of piston stroke and at a certain given pressure, in order to retard the timing of injection, the engine intake pressure will be reduced by throttling the desired amount, thus the piston will require a greater percentage of its stroke to produce the pressure required to actuate the injector. This action results due to the construction of the restraining spring 20, which operates at a fixed load.

As illustrated in Figure III, line 22 represents the relation between piston position and compression pressure as the air in the combustion chamber 12 is compressed, starting with a high atmospheric intake pressure resulting in the start of fuel injection at 23. Line 24 shows the same relation when starting with a low atmospheric intake pressure resulting in the start of fuel injection at 25. It is apparent that the timing of injection has been changed by an amount 26 which has a corresponding change in crank angle 27.

I prefer to throttle the intake air, thus controlling injection timing, by a sleeve valve device 28 which surrounds the injector 14 and is disposed substantially within the intake passage 15. The throttling action is illustrated by the arrows 29.

The fuel quantity to be injected into the combustion chamber 12 may be varied by rotation of the plunger 17 by means of the lever 30. It is to be understood that the timing of injection which is controlled by the atmospheric pressure in the engine at the start of compression by means of the valve 28, may be in phase with or in any relation to fuel quantity and engine speed. The preferred embodiment of my invention provides a single control for fuel quantity and injection timing, both being regulated by lever 30. I provide, however, an adjustment means 31 between lever 30 and valve 28 which is capable of providing the desired relationship between the timing of injection and the fuel quantity or engine speed.

It is therefore seen that due to a more efficient handling of the fuel according to the system forming my invention, wide ranges of engine speeds and engine loads are possible with a resulting superior operation.

The foregoing description is a preferred specification of my invention. It is to be understood that I do not wish to be limited thereto but expect to be accorded the full scope and spirit of my invention as determined by the following claims.

I claim:

1. In combination with an internal combustion engine, a combustion chamber, an air intake passage, an adjustable fuel injecting device disposed within the air intake passage, said device being actuated by the compression pressure in the combustion chamber, and a control means comprising a sleeve valve means surrounding said fuel injecting device arranged and constructed to regulate the quantity and direction of the intake air whereby the timing and cooling of the injecting device will be controlled.

2. In an internal combustion engine, the combination of a combustion chamber having an air intake passage, an adjustable fuel injector supported by said air intake passage and communicating with said combustion chamber to be actuated by the compression pressure therein, a throttling device disposed in said air intake passage comprising a valve means surrounding said fuel injector to regulate the quantity and direction of the intake air whereby the timing and cooling of the injector may be controlled.

3. In an internal combustion engine, the combination of a combustion chamber with an air intake passage, an injector adapted to deliver fuel to the combustion chamber, said injector being actuated by the compression pressure of the combustion chamber and being disposed substantially within the air intake passage, a throttling device disposed in said air intake passage substantially surrounding said fuel injector in such a manner that the flow of intake air is confined around said fuel injector, said throttling device having adjustment means therefor to regulate the quantity of intake air for control of the atmospheric pressure within the combustion chamber at the start of compression.

4. In an internal combustion engine, the combination of a combustion chamber with an air intake passage, an injector adapted to deliver fuel to the combustion chamber and being provided with means to adjust the quantity of fuel to be injected within the combustion chamber, said injector being disposed substantially within the air intake passage and adapted to be actuated by the compression pressure of the combustion chamber, a throttling device disposed in said air intake passage surrounding said fuel injector in such a manner that the flow of intake air is confined around said fuel injector, said throttling device being associated with said fuel adjusting means to regulate the quantity of intake air and fuel to be injected whereby the engine may be controlled under all operating conditions.

EARL M. WARD.